US010404126B2

(12) United States Patent
Yokoi et al.

(10) Patent No.: US 10,404,126 B2
(45) Date of Patent: Sep. 3, 2019

(54) CONDUCTOR UNIT FOR ROTATING ELECTRICAL MACHINE AND ROTATING ELECTRICAL MACHINE

(71) Applicant: Honda Motor Co., Ltd., Tokyo (JP)

(72) Inventors: Masashi Yokoi, Saitama (JP); Kenta Ninomiya, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 235 days.

(21) Appl. No.: 15/484,138

(22) Filed: Apr. 11, 2017

(65) Prior Publication Data

US 2017/0294815 A1 Oct. 12, 2017

(30) Foreign Application Priority Data

Apr. 12, 2016 (JP) ................................ 2016-079417

(51) Int. Cl.
*H02K 3/30* (2006.01)
*H02K 15/10* (2006.01)

(52) U.S. Cl.
CPC ............... *H02K 3/30* (2013.01); *H02K 15/10* (2013.01)

(58) Field of Classification Search
CPC .. H02K 3/30; H02K 3/44; H02K 5/08; H02K 5/22; H02K 3/50; H02K 15/10
USPC ............................................ 310/43, 71, 184
See application file for complete search history.

(56) References Cited

U.S. PATENT DOCUMENTS 6,894,410 B2 * 5/2005 Kobayashi ......... H02K 15/0056 310/239
8,154,163 B2 * 4/2012 Inoue ..................... H02K 3/522 310/71
2014/0319942 A1 * 10/2014 Nakayama ......... H02K 15/0435 310/71
2016/0276911 A1 * 9/2016 Moride .................... H02K 5/08
2016/0336829 A1 * 11/2016 Haruno .................. H02K 3/522
2018/0040392 A1 * 2/2018 Fujiwara .................. H01B 5/02
2019/0097506 A1 * 3/2019 Hashimoto .............. H02K 3/38

FOREIGN PATENT DOCUMENTS

CN 103828197 5/2014
JP 56-152225 A * 11/1981 ............. H01F 41/12
JP 2008-294363 * 12/2008 ............. H01F 30/00
JP 2015-096008 * 5/2015 ............. H02K 15/12
JP 2015-133873 7/2015

OTHER PUBLICATIONS

"Office Action of China Counterpart Application," dated Oct. 23, 2018, with English translation thereof, p. 1-p. 16.

* cited by examiner

*Primary Examiner* — Burton S Mullins
(74) *Attorney, Agent, or Firm* — JCIPRNET

(57) ABSTRACT

The present invention provides a conductor unit, which hardly generates an insulation-related fault, for a rotating electrical machine, and a rotating electrical machine. A supply line unit (30) of the rotating electrical machine comprises a conductor (35) and a resin part (32) that encapsulates at least a part of the conductor (35), where the resin portion has an air removing portion (51) leading to the conductor (35) in a powder coating coverage area (52), in which powder coating is further implemented on the resin part (32).

16 Claims, 8 Drawing Sheets

CONDUCTOR UNIT FOR ROTATING ELECTRICAL MACHINE AND ROTATING ELECTRICAL MACHINE

CROSS-REFERENCE TO RELATED APPLICATION

This application claims the priority benefit of Japan application serial no. 2016-079417, filed on Apr. 12, 2016. The entirety of the above-mentioned patent application is hereby incorporated by reference herein and made a part of this specification.

BACKGROUND OF THE INVENTION

1. Field of the Invention

The present invention relates to a conductor unit for a rotating electrical machine and a rotating electrical machine.

2. Description of Related Art

Previously, it is known that powder coating is implemented on a coil end portion located outside a stator core to form a stator that has an insulation portion. In addition, a stator is provided, where the stator includes a mold portion that covers the coil end portion, and a fixing means that holds a power line, and a communication portion that enables inside of the mold to be in communication with outside is provided on the fixing means (for example, referring to patent document 1).

PRIOR ART DOCUMENT

Patent Document

[Patent document 1] JP Patent Publication No. 2015-133873

SUMMARY OF THE INVENTION

Problems to Be Resolved By the Present Invention

When a resin portion is provided relative to a conductor by means of integral forming, a gap between an inner surface of the resin portion and the conductor exists sometimes. The gap is generated by contraction of the resin part during cooling of the integral forming. When such a gap exists, if powder coating is further implemented on the resin portion, air that exists in the gap is heated to expand sometimes, and consequently, an air bubble, an air gap (a trace of air injection), or the like, is generated on an insulation portion formed by powder coating. If such an air bubble, air gap, or the like is generated, insulativity decreases, and therefore repair needs to be performed.

The present invention is completed in view of the situation, and is directed to provide a conductor unit, which hardly generates an insulation-related fault, for a rotating electrical machine, and a rotating electrical machine.

Means for Resolving the Problems

To achieve the objective, the invention of a first invention is characterized in that: a conductor unit for a rotating electrical machine (for example, a supply line unit 30 or bus bar 26 in implementation manners) includes: a conductor (for example, a conductor 35 or a conductor 65 in the implementation manners); and a resin portion (for example, a resin part 32 or a resin part 62 in the implementation manners) that encpasulates at least a part of the conductor. The resin portion has an air removing portion (for example, an air removing portion 51 in the implementation manners) leading to the conductor in a powder coating coverage area (for example, a powder coating coverage area 52 in the implementation manners), in which powder coating is further implemented on the resin portion.

The invention of a second invention is characterized in that: the resin portion includes: a first surface (for example, a first surface 57 in the implementation manners), facing another element, into which a current flows with a phase different from that of a current flowing into the conductor (for example, a segment coil 25 in the implementation manners); and a second surface (for example, a second surface 58 in the implementation manners), different from the first surface; and the air removing portion is provided on the second surface.

The invention of a third invention is characterized in that: the air removing portion is formed in a circular hole shape.

The invention of a fourth invention is characterized in that: the air removing portion is formed in a slit shape.

To achieve the objective, the invention of a fifth invention is characterized in that: a conductor unit for a rotating electrical machine (for example, a supply line unit 30 or bus bar 26 in implementation manners) includes: a conductor (for example, a conductor 35 or a conductor 65 in the implementation manners); and a resin portion (for example, a resin part 32 or a resin part 62 in the implementation manners) that encapsulates at least a part of the conductor; in addition, powder coating is implemented on at least a part of the resin portion, where the resin portion comprises an air removing portion (for example, an air removing portion 51 in the implementation manners) leading to a gap (for example, a gap g in the implementation manners) that exists between an inner surface of the resin portion and the conductor.

To achieve the objective, the invention of a sixth invention is characterized in that: a conductor unit for a rotating electrical machine (for example, a supply line unit 30 or bus bar 26 in implementation manners) includes: a conductor (for example, a conductor 35 or a conductor 65 in the implementation manners); and a resin portion (for example, a resin part 32 or a resin part 62 in the implementation manners) that encapsulates at least a part of the conductor; in addition, powder coating is implemented on at least a part of the resin portion, where the resin portion comprises a sealant introduction portion (for example, a sealant introduction portion 71 in the implementation manners) for introducing a sealant (for example, a sealant 72 in the implementation manners); the sealant fills at least a part of a gap (for example, a gap g in the implementation manners) that exists between an inner surface of the resin portion and the conductor.

To achieve the objective, the invention of a seventh invention is characterized in that: a rotating electrical machine (for example, a rotating electrical machine 1 in implementation manners) includes: the conductor unit according to any one of the first invention to the sixth invention, and a powder coating portion (for example, a powder coating portion 14 in the implementation manners), covering at least a part of the conductor unit.

Effects of the Present Invention

According to the inventions of the first invention, the fifth invention, and the seventh invention, an air removing portion leading to the conductor is provided on the resin portion, and therefore even though powder coating is further implemented on the resin portion, and air that exists between an inner surface of the resin portion and the conductor expands, consequently, expanded air is discharged from the air removing portion to outside of the resin portion. Therefore, generation of air bubbles, air gaps, and the like can be inhibited on parts that need to be highly insulated. Therefore, generation of insulation-related faults can be inhibited.

According to the invention of the second invention, in the resin portion, the air removing portion is provided on a second surface different from a first surface that faces another part, and therefore even in a case in which the air removing portion is provided, insulativity between the conductor and another part can also be ensured more practically. Therefore, generation of insulation-related faults can be further inhibited.

According to the invention of the third invention, the air removing portion is a circular hole shape, and therefore the air removing portion can be processed more easily. Therefore, manufacturability of the conductor unit that has the air removing portion can be improved.

According to the invention of the fourth invention, the air removing portion is a slit shape, and therefore a width of the air removing portion becomes relatively small. Therefore, even in a case in which another part is configured near the air removing portion, an insulation distance between the conductor and the part can also be easily ensured. In other words, by forming the air removing portion into a slit shape, the air removing portion can be provided even on a part, on which it is difficult to provide a circular air removing portion in a viewpoint of the aspect of insulation.

According to the inventions of the sixth invention and the seventh invention, a gap that exists between an inner surface of the resin portion and the conductor is sealed by using a sealant. Therefore, generation of air bubbles, air gaps, and the like on an insulation portion formed by means of powder coating can be inhibited. Therefore, generation of insulation-related faults can be inhibited.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
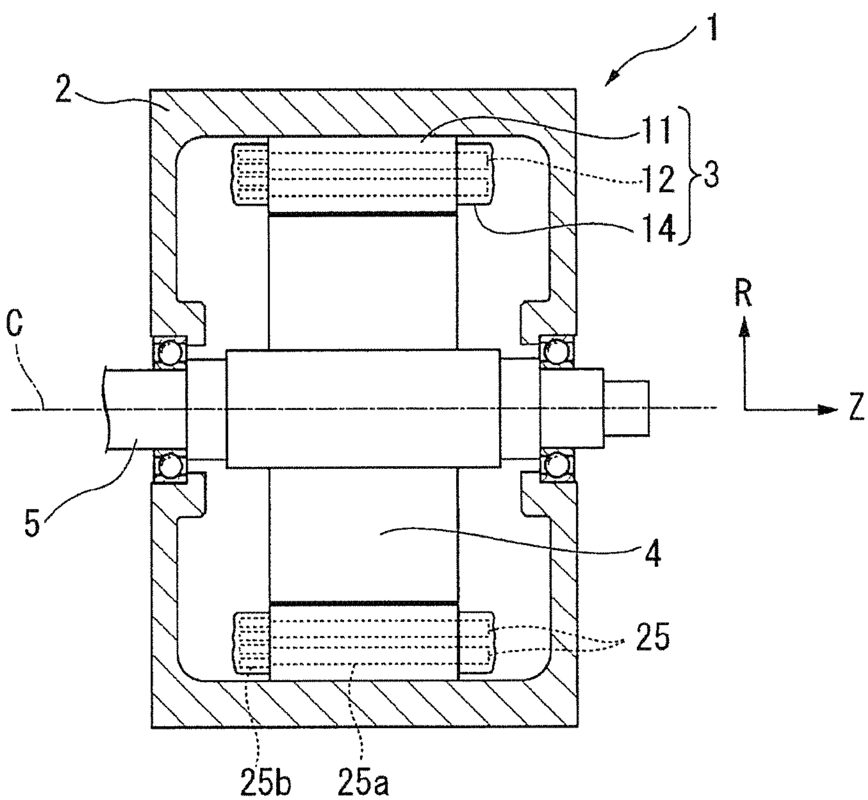
FIG. 1 is a cross-sectional view of an overall structure of a rotating electrical machine of a first present implementation manner.

Reference will now be made in detail to the present preferred embodiments of the invention, examples of which are illustrated in the accompanying drawings. Wherever possible, the same reference numbers are used in the drawings and the description to refer to the same or like parts.

Secondly, implementation manners of the present invention are described based on the accompanying drawings. Further, in the following description, structures that have approximately same or similar functions are marked with same symbols. In addition, repeated descriptions of the means are omitted sometimes.

(First Implementation Manner)

First, referring to FIG. 1 to FIG. 6, a first implementation manner is described.

FIG. 1 is a cross-sectional view of an overall structure of a rotating electrical machine 1 that includes a conductor unit of the present implementation manner. The rotating electrical machine 1, for example, is a travelling motor mounted on a vehicle, such as a hybrid automobile, or an electric automobile. However, the structure of the present implementation manner is not limited to the example, and may also be applied to a power generation motor, a motor for another use, or a rotating electrical machine for non-vehicle uses (including a generator). The rotating electrical machine 1 of the present implementation manner, for example, is a distributed winding motor, but is not limited thereto, and may also be concentrated winding motor.

As shown in FIG. 1, the rotating electrical machine 1 includes a housing 2, a stator 3, a rotor 4, and an output shaft 5.

The housing 2, for example, forms a cylindrical shape that accommodates the stator 3 and the rotor 4.

The stator 3 forms a ring shape, for example, is mounted on an inner peripheral surface of the housing 2. The stator 3 includes a stator core 11, and a coil 12 mounted on the stator core 11, to make a rotating magnetic field function on the rotor 4.

The rotor 4, for example, includes a rotor core, and a magnet mounted on the rotor core, and performs rotation driving on an inner side of the stator 3.

The output shaft 5 is connected to the rotor 4 to output rotation of the rotor 4 in a form of a driving force.

An axial direction Z, a radial direction R, and a peripheral direction θ (referring to FIG. 2) of the stator core 11 are defined herein. The axial direction Z of the stator core 11 is a direction that extends approximately in parallel to a rotation central shaft C of the output shaft 5. The radial direction R of the stator core 11 is a direction that radially departs from the rotation central shaft C and an opposite direction thereof (a direction close to the rotation central shaft C). The peripheral direction θ of the stator core 11 is a direction that keeps a fixed distance to the rotation central shaft C and rotates around the rotation central shaft C at the same time.

Secondly, the stator 3 is described in detail.

Figure 2:
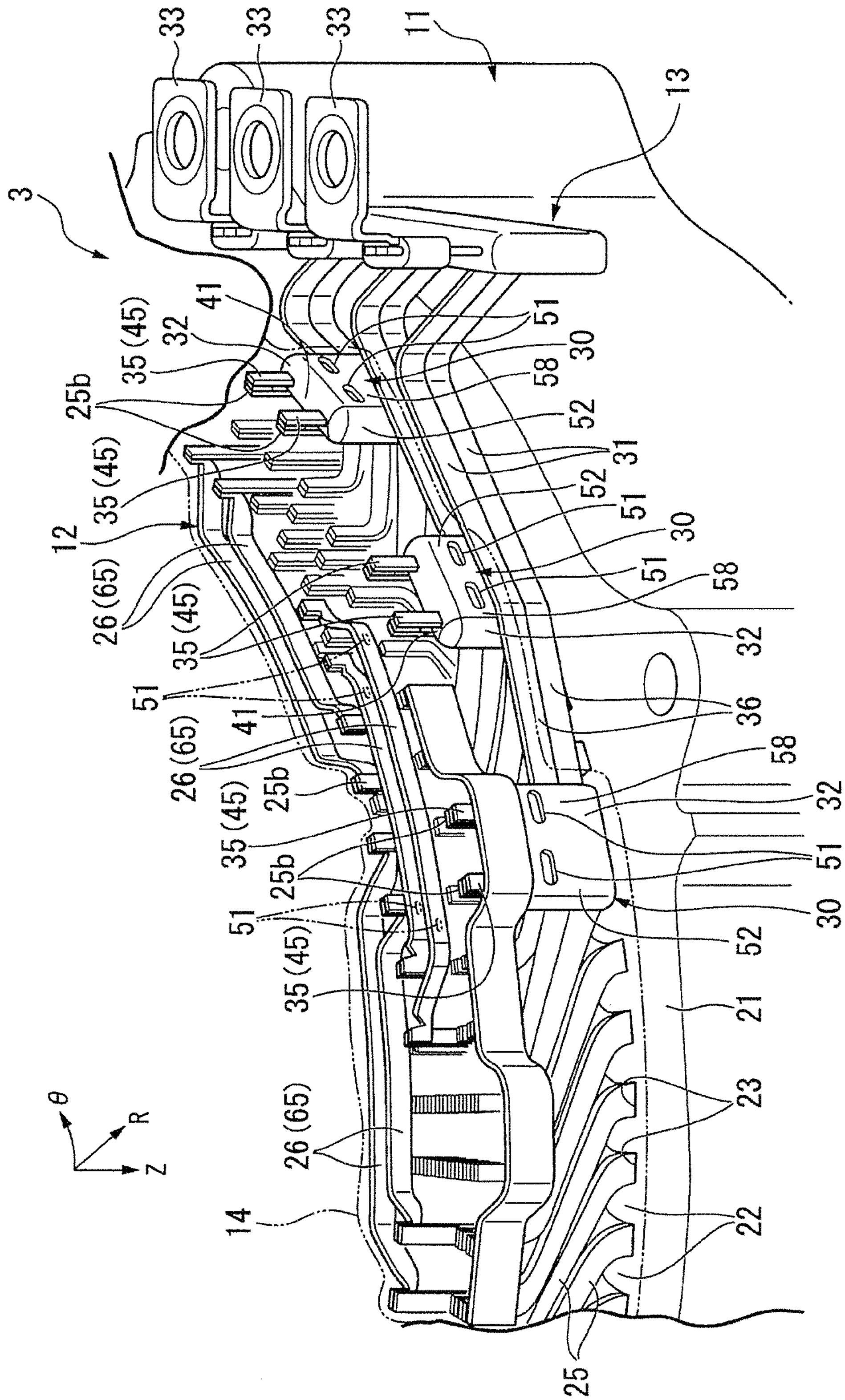
FIG. 2 is a three-dimensional diagram of a part of a stator of the first implementation manner.

FIG. 2 is a three-dimensional diagram of a part of the stator 3 of the present implementation manner.

As shown in FIG. 2, the stator 3 of the present implementation manner includes the stator core 11, the coil 12, a power supply line combination 13, and a powder coating portion 14.

The stator core 11 forms a ring shape that surrounds the rotor 4. In detail, the stator core 11 includes an annular magnet yoke portion 21, multiple teeth portions 22, and multiple slots 23. The multiple teeth portions 22 protrude from the magnet yoke portion 21 to an inner side of the radial direction R of the stator core 11. Each of the slots 23 is formed between adjacent two of the teeth portions 22 in the peripheral direction θ of the stator core 11. Each of the slots 23 penetrates through the stator core 11 in the axial direction Z of the stator core 11.

The coil 12 is inserted into the slots 23 of the stator core 11 to be mounted on the stator core 11. The coil 12 is a three-phase coil that includes a U phase, a V phase, and a W phase. The coil 12 of the present implementation manner is formed by connecting multiple segment coils 25 and multiple bus bars 26 to each other.

Each of the multiple segment coils 25 includes a straight line portion 25*a* (referring to FIG. 1) inserted into the slot 23, and a connection portion 25*b* located outside the slot 23. The connection portion 25*b* is an example of the "coil end portion" configured outside the stator core 11. The connection portion 25*b* is bonded to the connection portion 25*b* of another segment coil 25 by means of tungsten inert gas (tungsten inert gas, TIG), laser welding, or the like. Therefore, the multiple segment coils 25 are sequentially connected.

The multiple bus bars 26 are configured outside the stator core 11. Each of the bus bars 26 is provided between connection portions 25*b* of two segment coils 25 that are separated from each other, to electrically connect the connection portions 25*b* of the two segment coils 25 to each other. In FIG. 2, for ease of description, resin parts 62 included by the bus bars 26 shown in the figure are omitted. Further, the bus bars 26 will be described in detail below.

The power supply line combination 13, for example, includes three supply line units 30 that correspond to the U phase, the V phase, and the W phase. Each of the supply line units 30 includes multiple (for example, two) power supply lines 31, a resin part 32, and an external connection terminal 33. Each of the supply line units 30 is an example of the "conductor unit".

The multiple power supply lines 31 extend between the coil 12 of the stator 3 and the external connection terminal 33. Each of the multiple power supply lines 31 includes a conductor 35 formed by a metal material, such as copper, and an insulated cover layer 36 that covers a peripheral surface of the conductor 35. A front end portion of the conductor 35 protrudes outside the cover layer 36. The front end portion of the conductor 35 is configured beside the connection portion 25*b* of a corresponding segment coil 25, and is bonded to the connection portion 25*b* of the segment coil 25 by means of TIG welding, laser welding, or the like. Therefore, the multiple power supply lines 31 are electrically connected to the coil 12. Further, currents, phases of which are the same as each other, flow into the multiple power supply lines 31 that belong to a same supply line unit 30.

The resin part 32 is a holder that is provided near end portions of the multiple power supply lines 31 and integrally holds the multiple power supply lines 31. The resin part 32, for example, holds front end portions of the multiple power supply lines 31 at locations separated from each other. The resin part 32 is an example of the "resin part". The resin part 32 is an insulator, and encapsulates at least a part of each of the multiple power supply lines 31 (that is, multiple conductors 35). In the present implementation manner, the resin part 32 covers peripheral surfaces of the multiple power supply lines 31 (that is, peripheral surfaces of the multiple conductors 35). The resin part 32 encapsulates an end surface 41, which protrudes to outside of the resin part 32, of the conductor 35 of the power supply line 31.

The resin part 32 is integrally formed with the multiple power supply lines 31 (for example, embedded forming), so as to be integral with the multiple power supply lines 31. A resin material that forms the resin part 32 may be thermoplastic resin, or thermosetting resin. The resin part 32 will be described in detail below.

The external connection terminal 33 is electrically connected to a terminal, configured outside the stator 3, of a power supply. Therefore, the power supply supplies power to the coil 12 by means of the multiple power supply lines 31 and the external connection terminal 33.

The powder coating portion 14 is shown in FIG. 1 and FIG. 2, and for example, is set in a manner of covering approximately all of the connection portions 25*b* of the coil 12 and approximately all of the bus bars 26, and a part of the power supply line combination 13. In the present implementation manner, the powder coating portion 14 covers approximately all of the front end portions of the conductors 35 which protrude from the resin part 32, and at least a part of the resin part 32. The powder coating portion 14 is an insulation portion formed by further implementing powder coating on the connection portions 25*b* of the coil 12, the bus bars 26, the power supply line combination 13, and the like. For example, the powder coating portion 14 is formed by heating and thermally hardening insulated powder particles (powder paint), which are provided, in flowing state, by the connection portions 25*b* of the coil 12, the bus bars 26 and the power supply line combination 13, and the like.

Secondly, the resin part 32 of the supply line unit 30 is described in detail.

Figure 3:
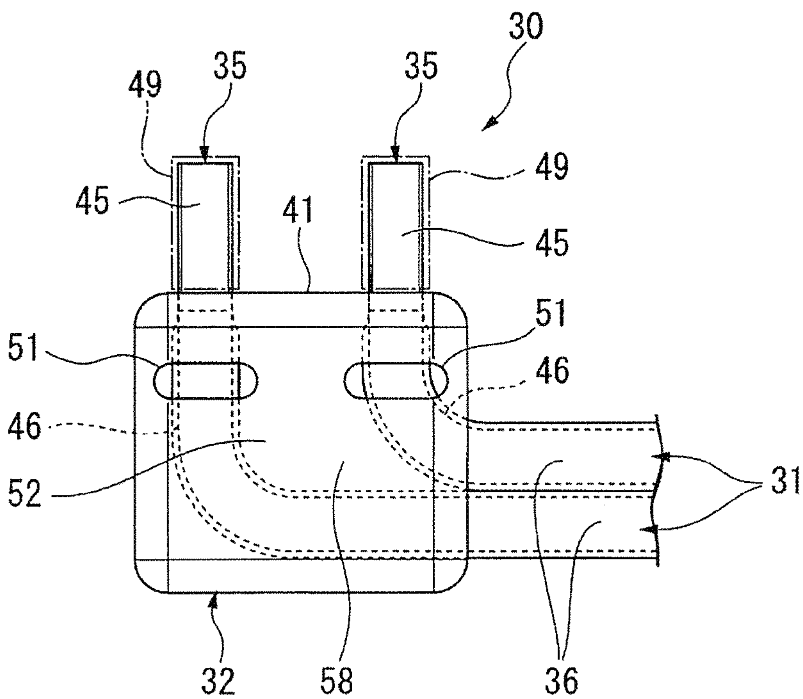
FIG. 3 is a front view of a part of a supply line unit of the first implementation manner.

FIG. 3 is a front view of a part of the supply line unit 30 of the present implementation manner.

As shown in FIG. 3, the resin part 32 of the present implementation manner includes multiple (for example, two) air removing portions 51. The air removing portion 51 is provided at a location facing the power supply line 31 (that is, a location facing the conductor 35). The air removing portion 51 is an air channel (air vent) that enables air to be discharged from a gap g that exists between an inner surface 32*a* of the resin part 32 and the conductor 35 when powder coating is implemented on the resin part 32. In detail, the conductor 35 of the power supply line 31 includes a protruding part (a first part) 45 that protrudes to outside of the resin part 32, and an included part (a second part) 46 included in the resin part 32. The protruding part 45 of the conductor 35 is an example of an insulation necessary part 49 that needs to be insulated by means of the powder coating portion 14.

The air removing portion 51 of the present implementation manner is a hole portion that leads to the included part 46 of the conductor 35 from a surface of the resin part 32. Further, the so-called "leads to the conductor" in the present application not only includes a case of directly leading to a surface of the conductor 35, but also includes a case of leading to a coverage layer 36 that covers a peripheral surface of the conductor 35. In the present implementation manner, the air removing portion 51 is formed in a circular shape (for example, an oval shape).

As shown in FIG. 3, the resin part 32 has a powder coating coverage area 52, in which powder coating is further implemented, on the resin part 32. That is, the powder coating coverage area 52 is an area covered by the powder coating portion 14. In the present implementation manner, the air removing portion 51 is provided in the powder coating coverage area 52. Further, the air removing portion 51 may be covered by the powder coating portion 14, for example, due to flow-in of a part of powder particles when powder coating is implemented on the resin part 32.

Figure 4:
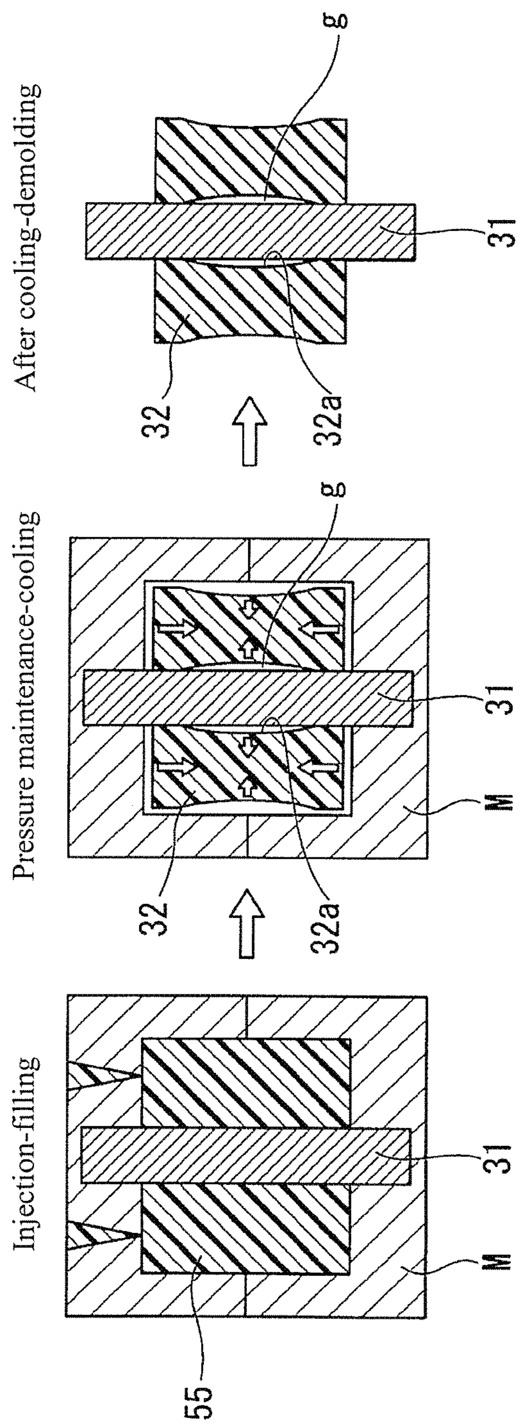
FIG. 4 is a cross-sectional view of status of a resin part of a supply line unit in a manufacturing process of the first implementation manner.

FIG. 4 is a cross-sectional view of status of the resin part 32 in a manufacturing process.

As shown in FIG. 4, for example, a resin material 55 that forms the resin part 32 is supplied to a periphery of the power supply lines 31 by assembling the power supply lines 31 in a mold M, so that the resin part 32 is integrally formed with the power supply lines 31. Herein, the resin part 32 contracts due to a temperature decrease when pressure maintenance and cooling are performed on the resin part 32 in the mold M. Therefore, the gap g generated due to contraction of the resin part 32 exists between the inner surface 32*a* of the resin part 32 and the power supply line 31 (that is, between the inner surface 32*a* of the resin part 32 and the conductor 35).

Figure 5:
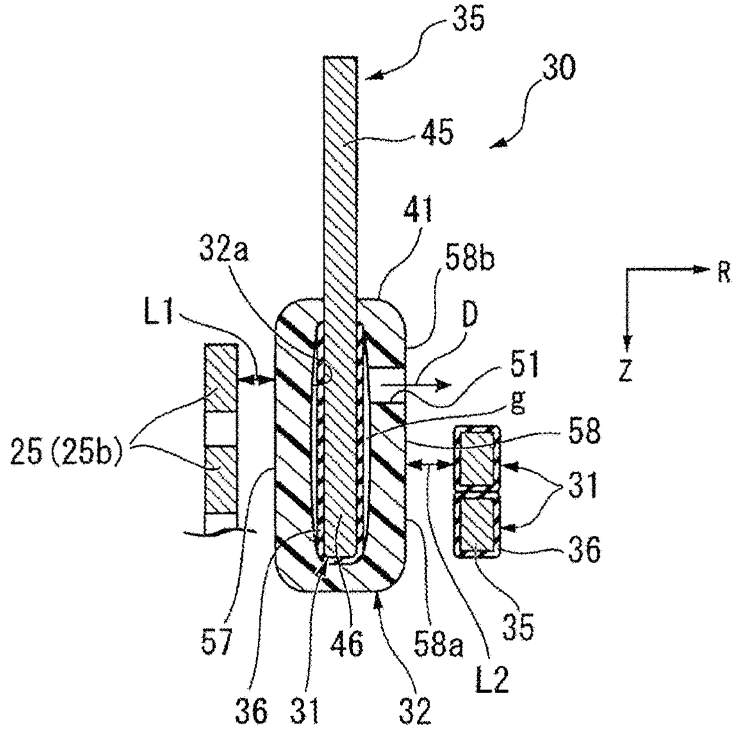
FIG. 5 is a cross-sectional view of a supply line unit of the first implementation manner.

FIG. 5 is a cross-sectional view of a supply line unit 30 of the present implementation manner.

As shown in FIG. 5, the air removing portion 51 leads to the gap g between the inner surface 32*a* of the resin part 32 and the power supply line 31. In other words, the air removing portion 51 enables the gap g that exists between the inner surface 32*a* of the resin part 32 and the power supply line 31 to be in communication with outside.

Secondly, the location at which the air removing portion 51 is provided is described.

As shown in FIG. 5, for example, the connection portions 25*b* of the segment coils 25 are configured on a periphery of the resin part 32. The segment coil 25 is an example of the "another part" and an example of the "first part". A Current, phase of which is different from that flows into the conductor 35 encapsulated in the resin part 32 (for example, currents with different phases in the U phase, the V phase, and the W phase), flow into the segment coil 25.

The resin part 32 of the present implementation manner includes a first surface 57 and a second surface 58. The first surface 57 and the second surface 58 are surfaces different from the protruding end surface 41 of the conductor 35 (for example, surfaces facing different directions). The first surface 57 faces the connection portion 25*b* of the segment coil 25 located beside the resin part 32. On the other aspect, the second surface 58 is a surface different from the first surface 57 (for example, a surface facing a different direction). The second surface 58, for example, is a surface located on a side opposite to the first surface 57. In addition, the air removing portion 51 is provided on the second surface 58.

In addition, in the present implementation manner, the power supply lines 31 of another supply line unit 30 are further configured on the periphery of the resin part 32. The power supply line 31 is an example of the "second part". A Current, phase of which is different from that flows into the conductor 35 encapsulated in the resin part 32 (for example, currents with different phases in the U phase, the V phase, and the W phase), flows into the power supply line 31. However, a distance L2 between the power supply line 31 and the resin part 32 is greater than a distance L1 between the connection portion 25*b* of the segment coil 25 and the resin part 32. In other words, the first surface 57 of the resin part 32 is a surface that faces a part, which is closest to the resin part 32, among parts located on the periphery of the resin part 32.

In addition, in another viewpoint, the second surface 58 of the resin part 32 includes a first area 58*a* and a second area 58*b*. The first area 58*a* faces the power supply line 31 in an opening direction D of the air removing portion 51 (a thickness direction of the resin part 32 and the radial direction R of the stator core 11). On the other aspect, the second area 58*b* does not face the power supply line 31 in the opening direction D of the air removing portion 51. However, the air removing portion 51 exceeds the first area 58*a* and is provided in the second area 58*b*.

Secondly, the bus bar 26 of the present implementation manner is described.

Figure 6:
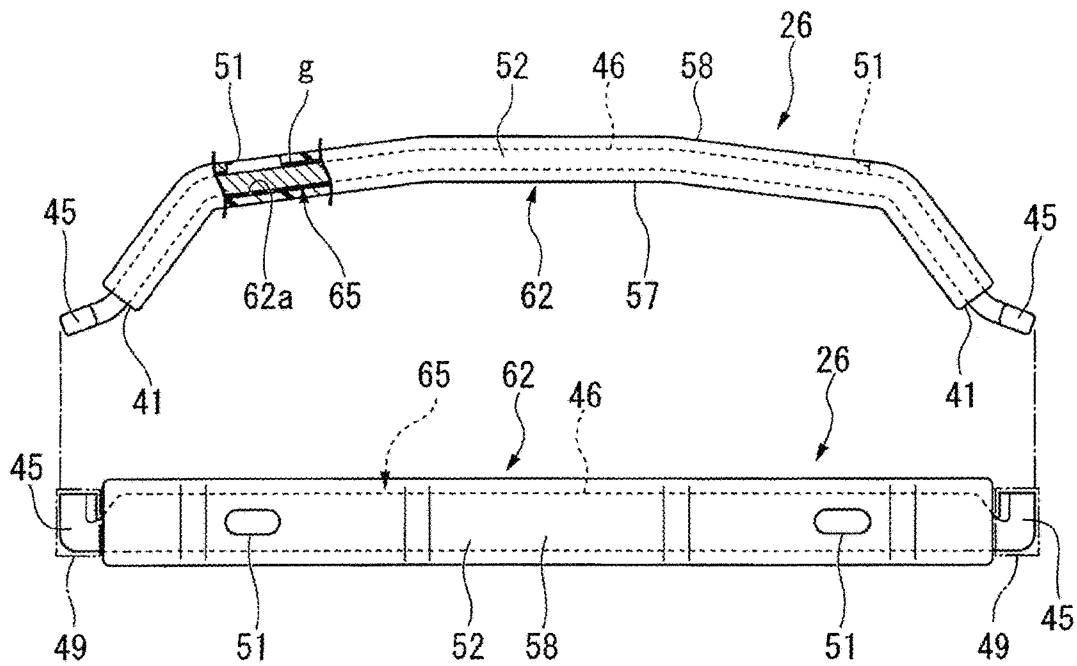
FIG. 6 is a diagram of a bus bar of the first implementation manner.

FIG. 6 is a diagram of the bus bar 26 of the present implementation manner.

As shown in FIG. 6, the bus bar 26 includes a resin part 62 and a conductor 65. The bus bar 26 is another example of the "conductor unit".

The conductor 65, for example, is formed by a metal material, such as copper. The front end portion of the conductor 65 protrudes to outside of the resin part 62. The front end portion of the conductor 65 is configured beside the connection portion 25*b* of a corresponding segment coil 25, and is bonded to the connection portion 25*b* of the segment coil 25 by means of TIG welding, laser welding, or the like.

The resin part 62 is an example of the "resin portion". The resin part 62 is an insulator, and encapsulates at least a part of the conductor 65. In the present implementation manner, the resin part 62 covers a peripheral surface of the conductor 65. The resin part 62 is integrally formed with the conductor 65 (for example, embedded forming), so as to be integral with the conductor 65. The gap g exists between an inner surface 62*a* of the resin part 62 and the conductor 65, and is generated due to contraction of the resin part 62 during cooling of integral forming of the resin part 62 relative to the conductor 65.

As shown in FIG. 6, the resin part 62 of the present implementation manner, for example, has the air removing portion 51 in the powder coating coverage area 52 of the resin part 62. The air removing portion 51 is provided at a location facing the conductor 65. The air removing portion 51 is, for example, a hole portion that leads to the included part 46 of the conductor 65 from the surface of the resin part 62. In other words, the air removing portion 51 leads to the gap g between the inner surface 62*a* of the resin part 62 and the conductor 65. The air removing portion 51, for example, is formed in a circular shape (for example, an oval shape). In the present implementation manner, a pair of air removing portions 51 is configured in a long edge direction of the resin part 62 in a manner of being separated from each other. For example, the air removing portion 51 is located on the long edge direction of the resin part 62, and is provided at a location closer to an end portion of the resin part 62 than a central part of the resin part 62.

In addition, as shown in FIG. 2, the connection portions 25*b* of the segment coils 25, into which a current, phase of which is different from that flows into the conductor 65 of the bus bar 26 (for example, currents with different phases in the U phase, the V phase, and the W phase), flows is configured on a periphery of the bus bar 26. As shown in FIG. 6, the resin part 62 of the bus bar 26 includes the first surface 57 and the second surface 58. The first surface 57 of the resin part 62 faces the connection portion 25*b* of the segment coil 25, into which a current, phase of which is different from that flows into the conductor 65 encapsulated in the resin part 62. On the other aspect, the second surface 58 of the resin part 62 faces, for example, the bus bar 26, into which a current, phases of which is the same as that flows into the conductor 65 encapsulated in the resin part 62. In addition, the air removing portion 51 is provided on the second surface 58.

Secondly, a function of the air removing portions 51 provided on the resin part 32 and the resin part 62 are described.

When powder coating is implemented on the connection portion 25*b* of the coil 12, powder coating is also implemented on the resin part 32 of the supply line unit 30 and the resin part 62 of the bus bar 26. Herein, powder particles for powder coating are supplied to the connection portion 25*b* of the coil 12, the resin part 32, or the resin part 62 in state of being heated to a relatively high temperature. Therefore, air that exists in the gap g between the inner surface 32*a* of the resin part 32 and the inner surface 62*a* of the resin part 62, and the conductor 35 and the conductor 65 is heated to expand. In addition, in the structure of the present implementation manner, expanded air is discharged from the air removing portion 51 of the resin part 32 and the resin part 62 to outside of the resin part 32 and the resin part 62.

According to the foregoing structure, generation of insulation-related faults can be inhibited.

Herein, for comparison, a case in which the air removing portion 51 is not provided on the resin part 32 or the resin part 62 is considered. In this case, during powder coating, expanded air moves along surfaces of the conductor 35 and the conductor 65, and is injected between the inner surface 32*a* of the resin part 32 and the inner surface 62*a* of the resin part 62, and the conductor 35 and the conductor 65 to outside from the end surface 41 of the resin part 32 and the end surface 41 of the resin part 62. Therefore, air bubbles or air gaps are generated on the powder coating portion 14 near the end surface 41 of the resin part 32 and the end surface 41 of the resin part 62. Locations near the end surface 41 of the resin part 32 and the end surface 41 of the resin part 62 are parts that are located near the protruding part 45 of the conductor 35 and the protruding part 45 of the conductor 65 and need relatively high insulativity. Therefore, when air bubbles or air gaps are generated near the end surface 41 of the resin part 32 and the end surface 41 of the resin part 62, repair needs to be performed sometimes. The air bubbles or air gaps are easily generated in cases in which high-viscosity insulating materials are used, for example, powder coating.

Therefore, in the present implementation manner, the air removing portions 51 that lead to the conductor 35 and the conductor 65 are provided on the resin part 32 and the resin part 62. Therefore, when powder coating is implemented on the resin part 32 and the resin part 62 to make air that exists between the inner surface 32*a* of the resin part 32 and the inner surface 62*a* of the resin part 62, and the conductor 35 and the conductor 65 expand, expanded air is discharged from the air removing portion 51 to outside of the resin part 32 and the resin part 62. Therefore, it is difficult to generate air bubbles, air gaps, and the like near the end surface 41 of the resin part 32 and the end surface 41 of the resin part 62. Therefore, insulativity on a periphery of the protruding part 45 of the conductor 35 and the protruding part 45 of the conductor 65 can be practically ensured. In other words, a phenomenon of generating air bubbles, air gaps, and the like on a part that needs high insulativity can be avoided by providing the air removing portion 51 on a part, on which an insulation function is slightly affected. That is, places, in which air bubbles or air gaps may be generated can be limited by setting the air removing portion 51. Therefore, generation of insulation-related faults can be inhibited. In addition, when generation of insulation-related faults can be inhibited, working hours needed by repair can be reduced.

In the present implementation manner, the air removing portion 51 is provided on the second surface 58 different from the first surface 57 that faces another part in the resin part 32 and the resin part 62. Therefore, even in a case in which the air removing portion 51 is provided, insulativity between the conductor 35 and conductor 65 and other parts can be ensured more practically. Therefore, generation of insulation-related faults can be further inhibited.

In the present implementation manner, the air removing portion 51 is a circular hole shape. The air removing portion 51 can be easily formed by using a cylindrical pin, or the like during integral forming of the resin part 32 and the resin part 62. Therefore, manufacturability of a part that includes the air removing portion 51 can be improved.

In the present implementation manner, the air removing portion 51 is provided at a location closer to the end portion of the resin part 62 than the central part of the resin part 62. According to the foregoing structure, a case in which air is injected from a boundary between the inner surface 62*a* of the resin part 62 and the conductor 65 on the end surface 41 of the resin part 62 can be further avoided practically. Therefore, generation of insulation-related faults can be further inhibited.

(Second Implementation Manner)

Figure 7:
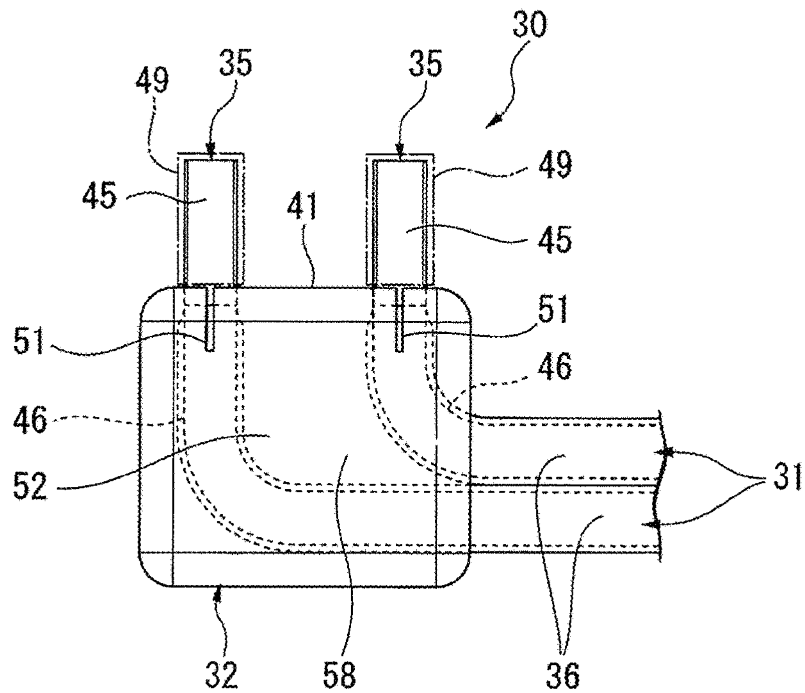
FIG. 7 is a front view of a part of a supply line unit of a second implementation manner.
Figure 8:
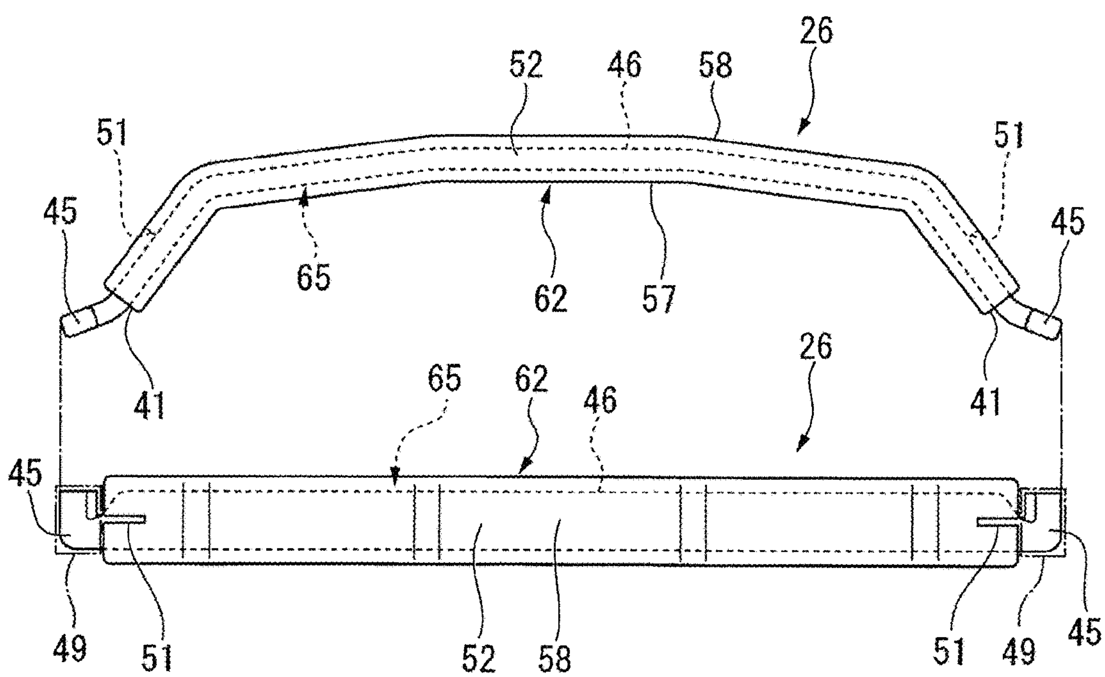
FIG. 8 is a diagram of a bus bar of the second implementation manner.

Secondly, referring to FIG. 7 and FIG. 8, the second implementation manner is described. The present implementation manner differs from the first implementation manner in that, an air removing portion 51 is formed in a slit shape. Further, other structures of the present implementation manner are the same as those of the first implementation manner. Therefore, descriptions of parts the same as those of the first implementation manner are omitted.

FIG. 7 is a front view of a part of the supply line unit 30 of the present implementation manner.

As shown in FIG. 7, in the present implementation manner, the air removing portion 51 of a resin part 32 is formed in a slit shape and leads to an encapsulated part 46 of a conductor 35 from a surface of the resin part 32. The slit-shaped air removing portion 51, for example, extends along the conductor 35. One end portion of the air removing portion 51 reaches an end surface 41 of the resin part 32.

FIG. 8 is a diagram of a bus bar 26 of the present implementation manner.

As shown in FIG. 8, in the present implementation manner, the air removing portion 51 of a resin part 62 forms a slit shape and leads to the encapsulated part 46 of a conductor 65 from a surface of the resin part 62. The slit-shaped air removing portion 51, for example, extends along the conductor 65. One end portion of the air removing portion 51 reaches the end surface 41 of the resin part 62.

According to the foregoing structure, similar to the first implementation manner, for example, a location, at which air bubbles or air gaps are generated may be limited, so as to inhibit generation of insulation-related faults. In addition, when the air removing portion 51 forms a slit shape, the air removing portion 51 can be provided even in a case in which it is difficult to provide a circular air removing portion 51 in a viewpoint of the aspect of insulation.

In addition, a width of the slit-shaped air removing portion 51 is less than that of the circular air removing portion 51, and therefore even in a case in which another part is configured near the air removing portion 51, a relatively long insulation distance between the conductor 35 and the conductor 65 and the part can be ensured.

(Third Implementation Manner)

Figure 9:
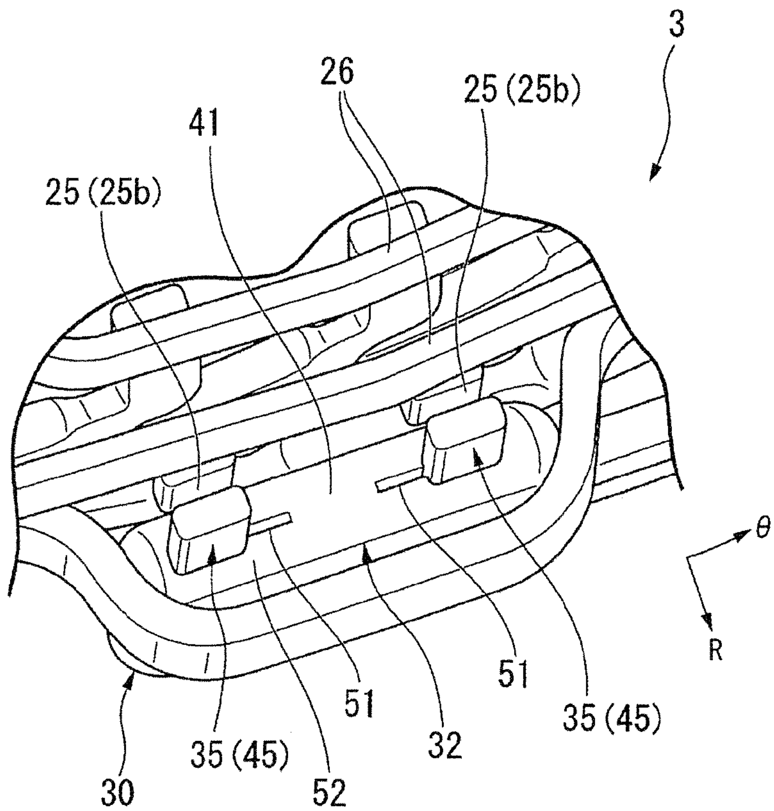
FIG. 9 is a three-dimensional diagram of a part of a supply line unit of a third implementation manner.

Secondly, referring to FIG. 9, the third implementation manner is described. The present implementation manner differs from the second implementation manner in that, a slit-shaped air removing portion 51 is provided in an area between a pair of conductors 35. Further, other structures of the present implementation manner are the same as those of the second implementation manner. Therefore, descriptions of parts the same as those of the second implementation manner are omitted.

FIG. 9 is a three-dimensional diagram of a part of a supply line unit 30 of the present implementation manner.

As shown in FIG. 9, the air removing portion 51 of the present implementation manner forms a slit shape and leads to an encapsulated part 46 of the conductor 35 from an end surface 41 of a resin part 32. The slit-shaped air removing portion 51 is provided in an area between a pair of conductors 35 on the end surface 41 of the resin part 32. In other words, the air removing portion 51 is provided between multiple conductors 35 into which, currents, of which phases are the same as each other (for example, currents with a same phase in a U phase, a V phase, and a W phase), flow. For example, the slit-shaped air removing portion 51 extends in a direction parallel to a pair of conductors 35. One end portion of the air removing portion 51 reaches a peripheral surface of the conductor 35.

According to the foregoing structure, the air removing portion 51 can be provided even in a case in which it is difficult to provide the air removing portion 51 in any part of a peripheral surface of the resin part 32 in a viewpoint of the aspect of insulation. Therefore, for example, a location at which air bubbles or air gaps are generated may be limited, so as to inhibit generation of insulation-related faults.

(Fourth Implementation Manner)

Figure 10:
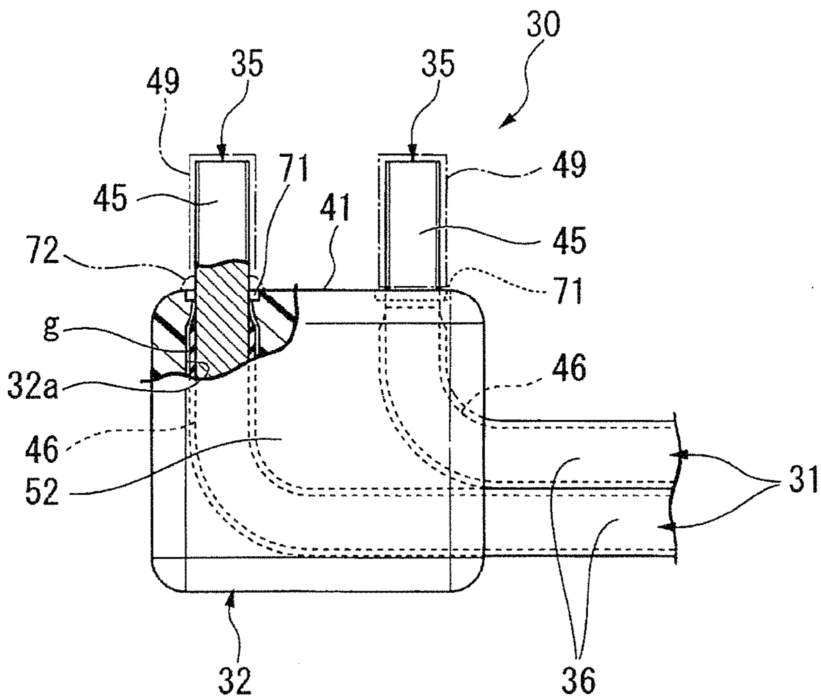
FIG. 10 is a front view of a part of a supply line unit of a fourth implementation manner.
Figure 11:
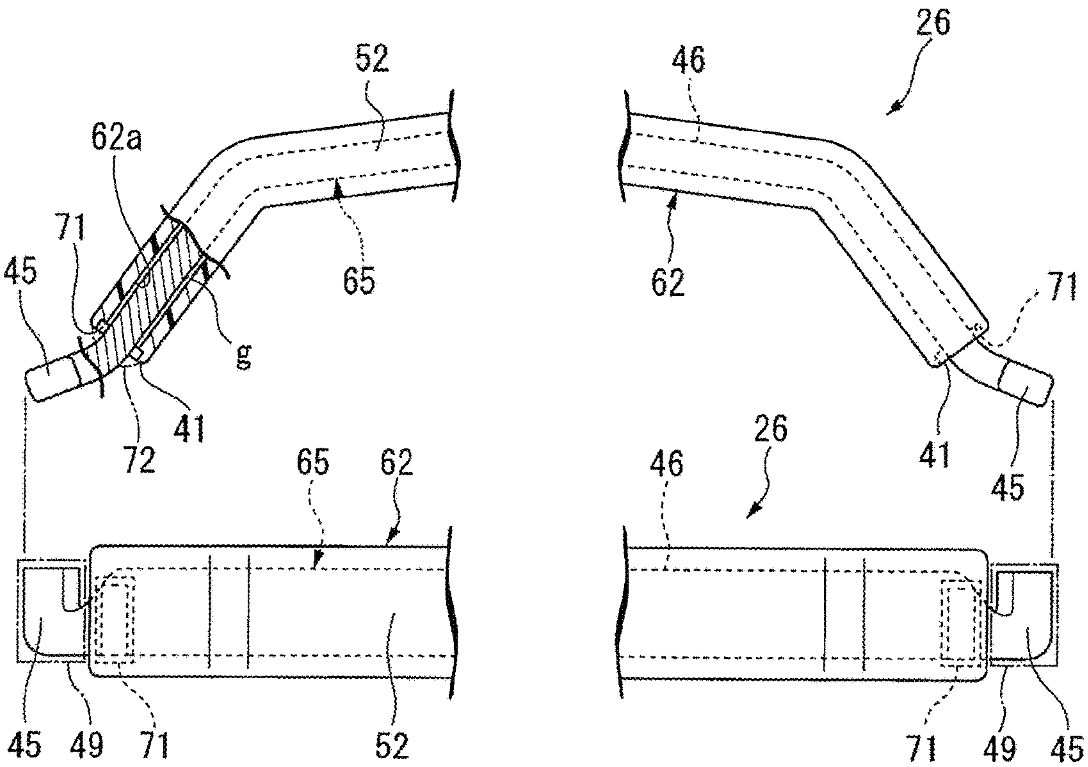
FIG. 11 is a diagram of a part of a bus bar of the fourth implementation manner.

Secondly, referring to FIG. 10 and FIG. 11, the fourth implementation manner is described. The present implementation manner differs from the first implementation manner in that, a sealant introduction portion 71 is provided to replace an air removing portion 51. Further, other structures of the present implementation manner are the same as those of the first implementation manner. Therefore, descriptions of parts the same as those of the first implementation manner are omitted.

FIG. 10 is a front view of a part of a supply line unit 30 of the present implementation manner.

As shown in FIG. 10, a resin part 32 of the present implementation manner has the sealant introduction portion 71 to replace the air removing portion 51. The sealant introduction portion 71 of the resin part 32 is provided in a powder coating coverage area 52 of the resin part 32. The sealant introduction portion 71 is, for example, a groove, into which a sealant 72 is dripped, provided on an end surface 41 of the resin part 32. The sealant introduction portion 71 leads to, for example, a gap g between an inner surface 32*a* of the resin part 32 and a conductor 35, to introduce the sealant 72 supplied to the sealant introduction portion 71 into the gap g between the inner surface 32*a* of the resin part 32 and the conductor 35. The sealant 72 supplied to the sealant introduction portion 71 enters the gap g between the inner surface 32*a* of the resin part 32 and the conductor 35, to fill at least a part of the gap g. In addition, in another viewpoint, the sealant 72 is located at least near the end surface 41 of the resin part 32 and blocks the gap g between the inner surface 32*a* of the resin part 32 and the conductor 35. Therefore, the gap g between the inner surface 32*a* of the resin part 32 and the conductor 35 is sealed by using the sealant 72.

The sealant 72, for example, is a potting material for insulated sealing, and an appropriate sealant is an epoxy-based sealant, a cyanoacrylate-based sealant, a silicone-based sealant, a polyimide-based sealant, or the like. The sealant, for example, may also be introduced into a relatively deep part of the gap g (a part far from the end surface 41) by means of vacuuming (that is, processing of pumping and decompressing air in the gap g). One example of the sealant 72 may also be thermosetting resin, which is thermosetting upon heating after being intruded into the gap g. In addition, surface processing may also be performed in advance on a surface of the conductor 35 to roughen the surface. In this case, a sealing function of the sealant 72 may be further improved by means of a anchor effect between the sealant 72 and the conductor 35.

FIG. 11 is a diagram of a part of a bus bar 26 of the present implementation manner.

As shown in FIG. 11, a resin part 62 of the present implementation manner also has the sealant introduction portion 71 to replace the air removing portion 51 as the resin part 32 of the supply line unit 30. The sealant introduction portion 71 of the resin part 62 is provided in the powder coating coverage area 52 of the resin part 62. The sealant introduction portion 71, for example, is provided on the end surface 41 of the resin part 62. The sealant introduction portion 71, for example, leads to the gap g between an inner surface 62*a* of the resin part 62 and a conductor 65, to introduce the sealant 72 supplied to the sealant introduction portion 71 into the gap g between the inner surface 62*a* of the resin part 62 and the conductor 65. The sealant 72 supplied to the sealant introduction portion 71 enters the gap g between the inner surface 62*a* of the resin part 62 and the conductor 65, to fill at least a part of the gap g. In addition, in another viewpoint, the sealant 72 is located at least near the end surface 41 of the resin part 62 and blocks the gap g between the inner surface 62*a* of the resin part 62 and the conductor 65. Therefore, the gap g between the inner surface 62*a* of the resin part 62 and the conductor 65 is sealed by using the sealant 72.

According to the foregoing structure, the gap g between the inner surface 32*a* of the resin part 32 and the inner surface 62*a* of the resin part 62, and the conductor 35 and the conductor 65 is sealed by using the sealant 72, and therefore a phenomenon of generating air bubbles, air gaps, and the like on a part that needs high insulativity can be inhibited. Therefore, generation of insulation-related faults can be inhibited even in a case in which it is difficult to provide the air removing portion 51.

The foregoing describes the implementation manners for implementing the present invention by using the implementation manners. However, the present invention is not limited to the implementation manners, and the like. Various modifications and replacements can be applied to the present invention without departing from the spirit of the present invention.

For example, the air removing portion 51 does not have to be provided in the powder coating coverage area 52. Air in the gap g that exists between the inner surface 32*a* of the resin part 32 and the inner surface 62*a* of the resin part 62, and the conductor 35 and the conductor 65 can also be discharged to outside by providing the air removing portion 51 in an area that exceeds the powder coating coverage area 52.

In addition, the sealant introduction portion 71 may also be provided in an area outside the end surface 41 of the resin part 32 and the end surface 41 of the resin part 62.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A conductor unit for a rotating electrical machine, comprising:
a conductor; and
a resin portion, encapsulating at least a part of the conductor, wherein
powder coating is implemented on at least a part of the resin portion, where the resin portion comprises an air removing portion leading to a gap that exists between an inner surface of the resin portion and the conductor.

2. A rotating electrical machine, comprising:
the conductor unit according to claim 1; and
a powder coating portion, covering at least a part of the conductor unit.

3. A conductor unit for a rotating electrical machine, comprising:
a conductor; and
a resin portion, encapsulating at least a part of the conductor, wherein
powder coating is implemented on at least a part of the resin portion, where the resin portion comprises a sealant introduction portion for introducing a sealant; the sealant fills at least a part of a gap that exists between an inner surface of the resin portion and the conductor.

4. A rotating electrical machine, comprising:
the conductor unit according to claim 3; and
a powder coating portion, covering at least a part of the conductor unit.

5. A conductor unit for a rotating electrical machine, comprising:
a conductor; and
a resin portion, encapsulating at least a part of the conductor, wherein
the resin portion has an air removing portion leading to the conductor, wherein the air removing portion is in a powder coating coverage area, in which powder coating is further implemented on the resin portion, and the air removing portion is located on the long edge direction of the resin portion, and is provided at a location closer to an end portion of the resin portion than a central part of the resin portion.

6. The conductor unit for a rotating electrical machine according to claim 5, wherein the resin portion comprises:
a first surface, facing another element, into which a current flows with a phase different from that of a current flowing into the conductor; and
a second surface, different from the first surface; and
the air removing portion is provided on the second surface.

7. The conductor unit for a rotating electrical machine according to claim 6, wherein the air removing portion is formed in a circular hole shape.

8. A rotating electrical machine, comprising:
the conductor unit according to claim 7; and
a powder coating portion, covering at least a part of the conductor unit.

9. The conductor unit for a rotating electrical machine according to claim 6, wherein the air removing portion is formed in a slit shape.

10. A rotating electrical machine, comprising:
the conductor unit according to claim 9; and
a powder coating portion, covering at least a part of the conductor unit.

11. A rotating electrical machine, comprising:
the conductor unit according to claim 6; and
a powder coating portion, covering at least a part of the conductor unit.

12. The conductor unit for a rotating electrical machine according to claim 5, wherein the air removing portion is formed in a circular hole shape.

13. A rotating electrical machine, comprising:
the conductor unit according to claim 12; and
a powder coating portion, covering at least a part of the conductor unit.

14. The conductor unit for a rotating electrical machine according to claim 5, wherein the air removing portion is formed in a slit shape.

15. A rotating electrical machine, comprising:
the conductor unit according to claim 14; and
a powder coating portion, covering at least a part of the conductor unit.

16. A rotating electrical machine, comprising:
the conductor unit according to claim 5; and
a powder coating portion, covering at least a part of the conductor unit.

* * * * *